(12) United States Patent
Nesti et al.

(10) Patent No.: US 12,208,853 B2
(45) Date of Patent: Jan. 28, 2025

(54) TRANSMISSION UNIT FOR MOTOR VEHICLES WITH REVERSE DRIVE AND MOTOR VEHICLE COMPRISING THE TRANSMISSION UNIT

(71) Applicant: PIAGGIO & C. S.P.A., Pontedera (IT)

(72) Inventors: Paolo Nesti, Pontedera (IT); Stefano Doveri, Pontedera (IT)

(73) Assignee: PIAGGIO & CO. S.P.A., Pontedera (IT)

( * ) Notice: Subject to any disclaimer, the term of this patent is extended or adjusted under 35 U.S.C. 154(b) by 894 days.

(21) Appl. No.: 17/288,421

(22) PCT Filed: Oct. 28, 2019

(86) PCT No.: PCT/IB2019/059214
§ 371 (c)(1),
(2) Date: Apr. 23, 2021

(87) PCT Pub. No.: WO2020/089766
PCT Pub. Date: May 7, 2020

(65) Prior Publication Data
US 2021/0380200 A1    Dec. 9, 2021

(30) Foreign Application Priority Data

Oct. 30, 2018   (IT) .................. 102018000009928

(51) Int. Cl.
*F16H 63/30*   (2006.01)
*B62M 7/04*    (2006.01)
(Continued)

(52) U.S. Cl.
CPC ............ *B62M 23/02* (2013.01); *B62M 25/08* (2013.01); *F16H 61/16* (2013.01); *F16H 63/302* (2013.01);
(Continued)

(58) Field of Classification Search
CPC .. F16H 63/302; F16H 61/16; F16H 2061/165; B62M 23/02; B62M 7/04; B62M 9/06
See application file for complete search history.

(56) References Cited

U.S. PATENT DOCUMENTS 1,822,673 A  *  9/1931  Schwenke ............. F02N 19/001
                                                      74/6
3,211,249 A  *  10/1965  Papst ..................... B60K 6/383
                                                      290/19
(Continued)

FOREIGN PATENT DOCUMENTS

DE        4135215 A1    4/1993
EP        2604459 A2    6/2013
(Continued)

*Primary Examiner* — Ha Dinh Ho
(74) *Attorney, Agent, or Firm* — McGlew and Tuttle, P.C.

(57) ABSTRACT

The transmission unit (15) for motor vehicle (1) comprises a shaft (23) of the driving wheel, operatively connected to a main drive (19, 97) to control forward drive, and a reverse drive electric motor (21). The transmission unit further comprises a control bushing (47) rotated by the reverse drive electric motor (21), and a driven transmission bushing (63), operatively connected to the shaft (23) of the driving wheel. An actuator (121) is provided for controlling mutual coupling between the control bushing (47) and the driven transmission bushing (63) to transmit the motion of the reverse drive electric motor (21) to the shaft (23) of the driving wheel.

27 Claims, 12 Drawing Sheets

(51) Int. Cl.
*B62M 9/06* (2006.01)
*B62M 23/02* (2010.01)
*B62M 25/08* (2006.01)
*F16H 61/16* (2006.01)

(52) U.S. Cl.
CPC ............ *B62K 2202/00* (2013.01); *B62M 7/04* (2013.01); *B62M 9/06* (2013.01); *F16H 2061/165* (2013.01)

(56) References Cited

U.S. PATENT DOCUMENTS

| | | | |
|---|---|---|---|
| 4,410,071 A * | 10/1983 | Osterman | F16H 3/663 |
| | | | 475/8 |
| 4,763,538 A | 8/1988 | Fujita et al. | |
| 4,923,028 A | 5/1990 | Yamashita et al. | |
| 6,457,381 B1 * | 10/2002 | Nonaka | B62M 7/02 |
| | | | 74/342 |
| 8,555,739 B2 * | 10/2013 | Ieda | F16H 63/18 |
| | | | 74/473.26 |
| 8,919,479 B1 * | 12/2014 | Langlands | B62M 11/04 |
| | | | 180/219 |
| 9,926,040 B2 | 3/2018 | Huber et al. | |
| 2009/0326771 A1 * | 12/2009 | Murayama | F16H 61/0403 |
| | | | 701/54 |

FOREIGN PATENT DOCUMENTS

| | | |
|---|---|---|
| JP | 2014108636 A | 6/2014 |
| JP | 2014152832 A | 8/2014 |
| WO | 2005077694 A1 | 8/2005 |

* cited by examiner

TRANSMISSION UNIT FOR MOTOR VEHICLES WITH REVERSE DRIVE AND MOTOR VEHICLE COMPRISING THE TRANSMISSION UNIT

TECHNICAL FIELD

The present invention relates to a transmission unit with reverse drive, in particular, but not exclusively, for motor vehicles with two or three wheels. The invention further relates to a motor vehicle comprising the aforesaid transmission unit.

BACKGROUND ART

As is well known, motor vehicles, in particular motorcycles, are normally not provided with reverse drive. Therefore, when in rearwards operation it is rather awkward to move them because they are heavy and difficult to move, especially if the driver is astride the saddle. It is also awkward to get off the saddle to push the motor vehicle manually. This operation becomes particularly complicated when a passenger also sits on the motor vehicle. The operation of manual pushing then becomes almost impossible if the motor vehicle is not on smooth, flat ground.

To overcome these drawbacks, some motorcycles, especially high-mass ones, are provided with reverse drive, which uses a gear box that is very similar to those in use in the automotive industry. However, these solutions are costly and necessarily require the use of a gear transmission. Hence, they do not apply to motorcycles that use a speed variator transmission.

U.S. Pat. No. 4,923,028 discloses a motorcycle with an electric motor that controls reverse drive. The electric motor is placed in mechanical connection with a main cardan shaft, which takes its motion from the endothermic engine that controls forward drive. The system is complex, bound to the use of a cardan shaft and intrinsically not safe.

U.S. Pat. No. 9,926,040 discloses a mechanism for reverse drive of motor vehicles, which uses an auxiliary electric motor which transmits motion to a reduction gear, which can be engaged on a shaft for transmitting motion to the driving wheel by means of an actuator. The motion from the electric motor to the reduction gear is transmitted through a flexible shaft. The system is complex, bulky and poorly functional.

Therefore, there is a need to provide a transmission unit that fully or partly overcomes or reduces the drawbacks and the limits of known transmissions.

SUMMARY OF THE INVENTION

To overcome or alleviate one or more of the limits and drawbacks of the transmission units with reverse drive of the current art, a transmission unit for motor vehicle is provided, comprising a shaft of the driving wheel operatively connected to a main transmission for controlling forward drive, and a reverse drive electric motor. The transmission unit further comprises a control bushing rotated by the reverse drive electric motor, and a driven transmission bushing, operatively connected to the shaft of the driving wheel. An actuator is also provided for controlling mutual coupling between the control bushing and the driven transmission bushing to transmit the motion of the reverse drive electric motor to the shaft of the driving wheel.

In this way, with the actuator it is possible to control the engagement of the reverse drive and the shaft of the driving wheel can be rotated by the electric motor in the direction opposite to the normal direction of rotation for forward drive.

In embodiments disclosed herein, the actuator is preferably a linear actuator, i.e. provided with an actuation element that is movable according to an axis of translation. The actuator can be an electric actuator, for example a solenoid actuator, with an actuation element that can comprise an anchor, movable by effect of the electromagnetic force generated by the magnet.

In advantageous embodiments, the control bushing and the driven transmission bushing are coaxial to the shaft of the driving wheel and rotate with this latter about a rotation axis during reverse drive.

In embodiments disclosed herein, the control bushing is connected to the reverse drive electric motor by means of an auxiliary drive. This drive provides the correct gear ratio between electric motor and control bushing. In particularly advantageous embodiments, the auxiliary drive comprises a gear train, i.e. a series of pairs of mutually meshing gears, and preferably comprising at least one auxiliary shaft and preferably two auxiliary shafts, on each of which respective pairs of gears are splined. In advantageous embodiments, the drive is such that the rotation axis of the electric motor is parallel to the rotation axis of the shaft of the driving wheel. In this case, the drive should comprise a series of spur gears.

In embodiments disclosed herein, the control bushing is torsionally coupled to a selector, which is axially movable with respect to the control bushing and functionally coupled to the actuator. The term "axially movable" means that the selector is movable parallel to its own rotation axis. When the selector and the control bushing are coaxial to each other and to the shaft of the transmission wheel, the axial movement of the selector is a movement parallel to the common rotation axis, of the shaft of the driving wheel and of the control bushing.

In advantageous embodiments, the driving wheel of the motor vehicle is not directly connected to the shaft of the driving wheel. On the contrary, an axle coaxial to the driving wheel can be provided, which is connected to the shaft of the driving wheel by means of an additional transmission, preferably a gear transmission. These can be spur gears to arrange the shaft of the driving wheel and the axle of the driving wheel mutually parallel.

The selector can be axially movable to take: a first disengaged position with respect to the driven transmission bushing, wherein the selector is torsionally coupled only to the control bushing; and a second engaged position with respect to the driven transmission bushing, wherein the selector is torsionally coupled to the control bushing and to the driven transmission bushing, to transmit a torque from the control bushing to the driven transmission bushing.

The selector can comprise first engaging toothing, adapted to co-act with second engaging toothing integral with the driven transmission bushing to transmit the rotation of the control bushing to the driven transmission bushing. The engaging teeth can be frontal engaging teeth and can for example be beveled, to allow the selector and the driven bushing to move away from each other when the driven bushing tends to rotate at an angular speed higher than the speed of rotation of the selector and of the control bushing.

The transmission unit can comprise a safety system adapted to prevent reverse drive actuation if the shaft of the driving wheel is turning in a direction of forward movement. The safety system can for example be a safety system based on centrifugal effect.

In some embodiments, the safety system comprises at least one centrifugal mass, and preferably a pair of centrifugal masses, rotating with the shaft of the driving wheel and movable radially with respect thereto, as a result of the centrifugal force, from a retracted position to an extracted position, in said extracted position the centrifugal mass preventing reverse drive actuation. In advantageous embodiments, the safety system is configured to prevent mutual engaging between the selector and the driven transmission bushing if the shaft of the driving wheel is rotating in a direction of forward movement at a speed greater than a minimum safety value.

To control the engagement and disengagement of the reverse drive, in advantageous embodiments a movable fork can be provided, operatively connected to the actuator and to the selector so as to allow the activation and the deactivation of the reverse drive.

In advantageous embodiments, the fork can be integral to a pin or stem, or it can comprise a stem or pin, parallel to an axis of translation of the fork, the translation motion being imparted by the aforesaid actuator, to control the engagement and disengagement of the reverse drive.

When the actuator is a linear actuator provided with an element movable according to an axis of the actuator, the axis of translation of the fork is advantageously parallel to the axis of the actuator.

In some embodiments, the selector is torsionally free with respect to the fork, i.e. it is fastened thereto in such a way as to be able to rotate around its own rotation axis with respect to the fork, which is not rotating. Moreover, advantageously, the selector can be axially fastened to the fork, so that a movement of the fork, for example an axial movement of the fork imparted by the actuator, determines a movement of the selector along the rotation axis of the selector.

To transmit the movement of the actuator to the fork, it is advantageous to provide a control lever adapted to rotate around an articulation pin and functionally connected to the actuator and to the fork to transmit the movement of the actuator to the fork. The lever can be configured as a force multiplier lever. In particular, in particularly advantageous embodiments, the articulation pin is arranged in an intermediate position between a first constraint of the lever to the actuator and a second constraint of the lever to the fork. With appropriate ratios between the distances of the two constraints to the rotation axis of the lever, defined by the pin, a multiplication of the force generated by the actuator is obtained, for easier control of the fork.

In embodiments disclosed herein, the electric motor and the actuator controlling the engagement and disengagement of the reverse drive can be mounted on a case, in which the main drive that transmits the power of the endothermic engine to the driving wheel is housed, in particular and advantageously a drive with continuous variator of the transmission ratio.

In embodiments disclosed herein, the actuator can be mounted outside the case. In some embodiments, the electric motor can be mounted inside the case. The case can house the shaft of the driving wheel and the drive wheel axle, as well as the members coaxial to the shaft of the driving wheel, in particular the control bushing and the driven transmission bushing, and the selector, with the fork for controlling the engagement and disengagement movement. The transmission, preferably a gear transmission, between the electric motor and the control bushing, as well as the transmission from the shaft of the driving wheel to the drive wheel axle, can be mounted in the case.

In advantageous embodiments, the arrangement of the members of the reverse drive with respect to the case is such as not to require changes relative to the case of the prior art, for transmission units lacking reverse drive.

Also disclosed herein is a motor vehicle comprising a transmission unit as defined above and an internal combustion engine operatively connected to shaft of the driving wheel by means of the main drive.

Additional advantageous features and embodiments are described below and in the accompanying claims.

BRIEF DESCRIPTION OF THE DRAWINGS

The invention will be better understood following the description and the accompanying drawings, which illustrate an exemplifying and non-limiting embodiment of the invention. More in particular, in the drawing, the figures show.

DETAILED DESCRIPTION OF AN EMBODIMENT

Figure 1:
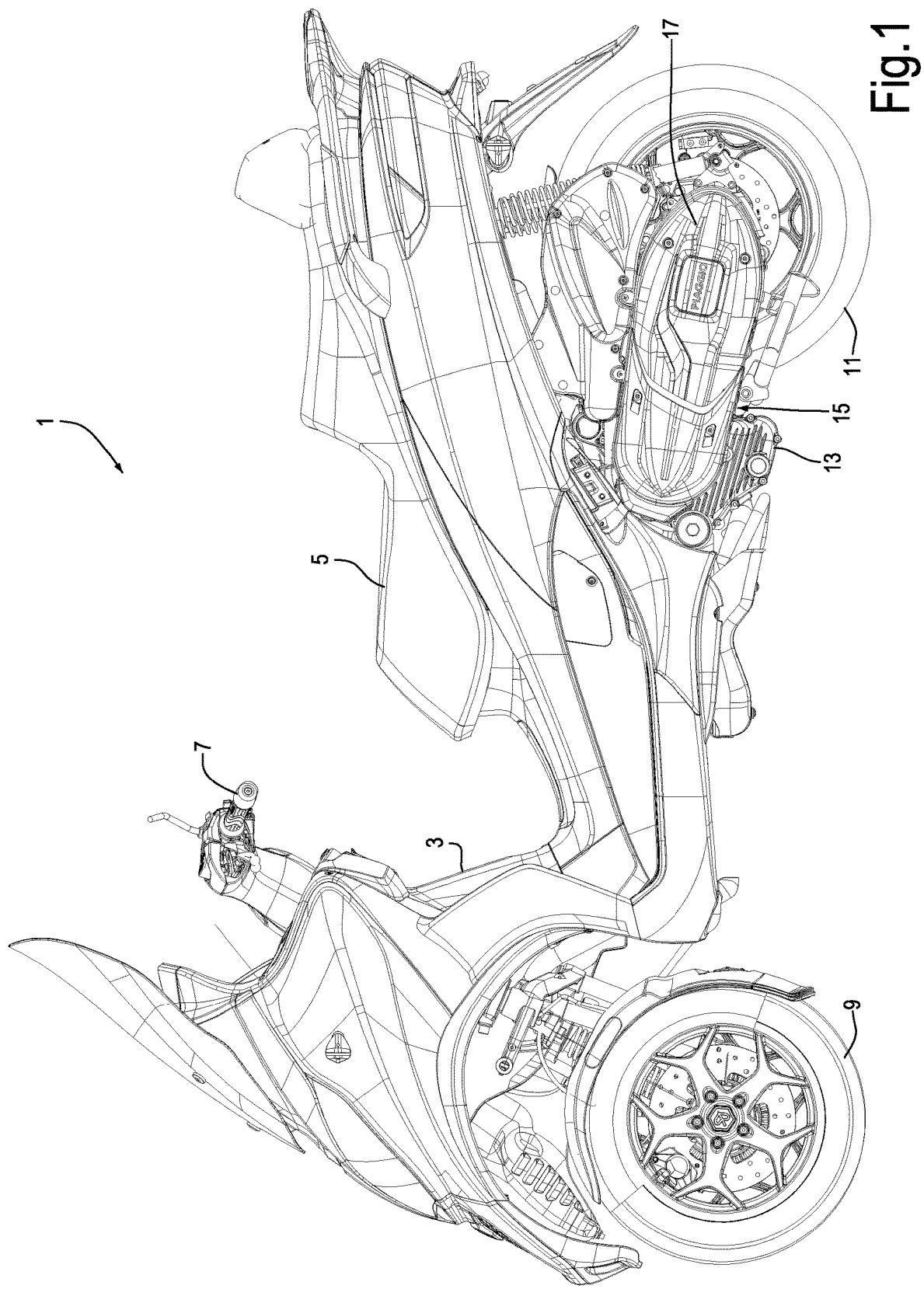
FIG. 1, a lateral view of a motor vehicle, with a transmission unit according to the invention.

FIG. 1 shows a lateral view of a motor vehicle 1, in the illustrated example a scooter, to which a transmission unit according to the invention can be applied. The motor vehicle comprises a chassis 3 with a saddle 5, a handlebar 7 that controls the steering of one or two front steered wheels 9, a rear driving wheel 11 and an endothermic engine 13 that generates the mechanical power necessary for the vehicle to advance forward. Reference number 15 indicates in its entirety a transmission unit that transfers mechanical power from the endothermic engine to the driving wheel 11. The transmission unit comprises a case 17, within which are housed the mechanical transmission of power from the endothermic engine 13 to the driving wheel 11 and a device for varying the transmission ratio from the endothermic engine 13 to the driving wheel 11, for example a continuously variable transmission (briefly, CVT).

Figure 2:
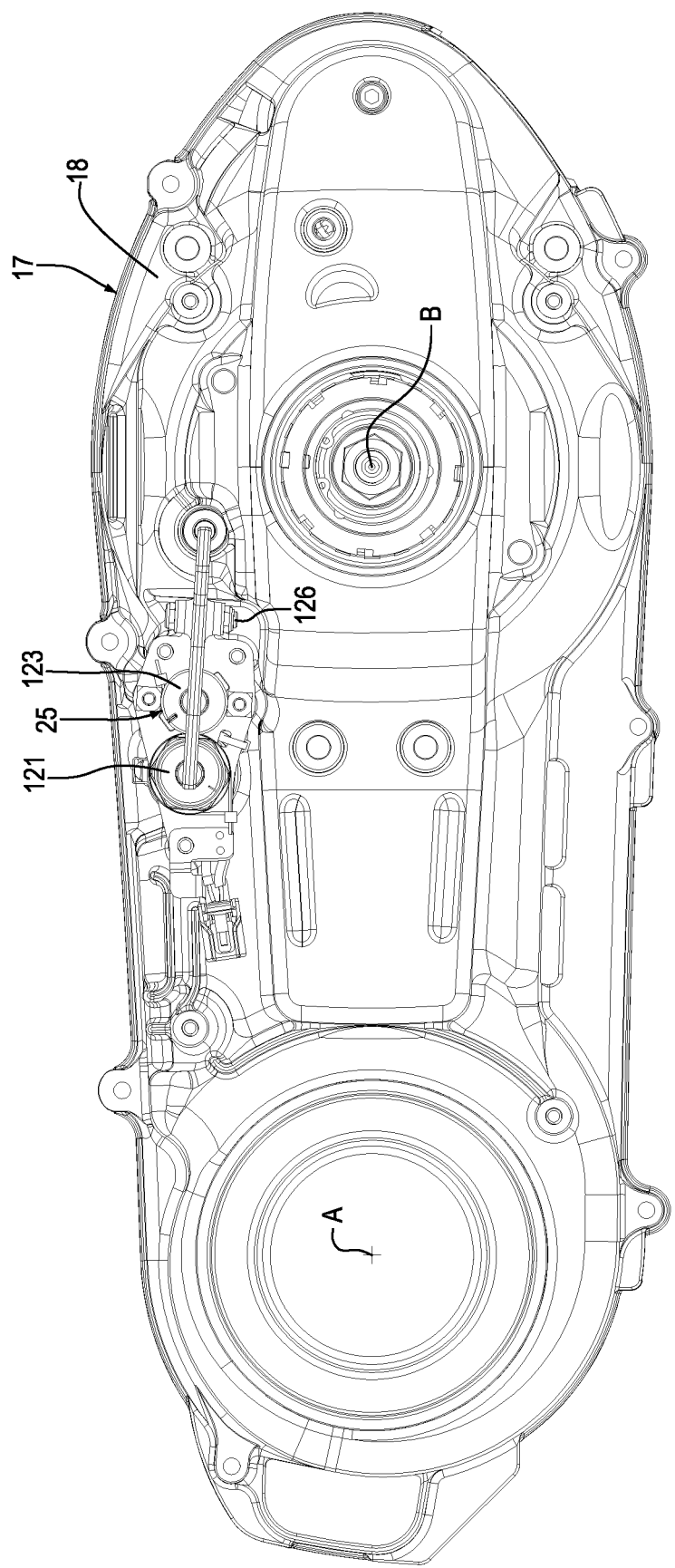
FIG. 2, an external view of a lid of the case housing the transmission unit.
Figure 3:
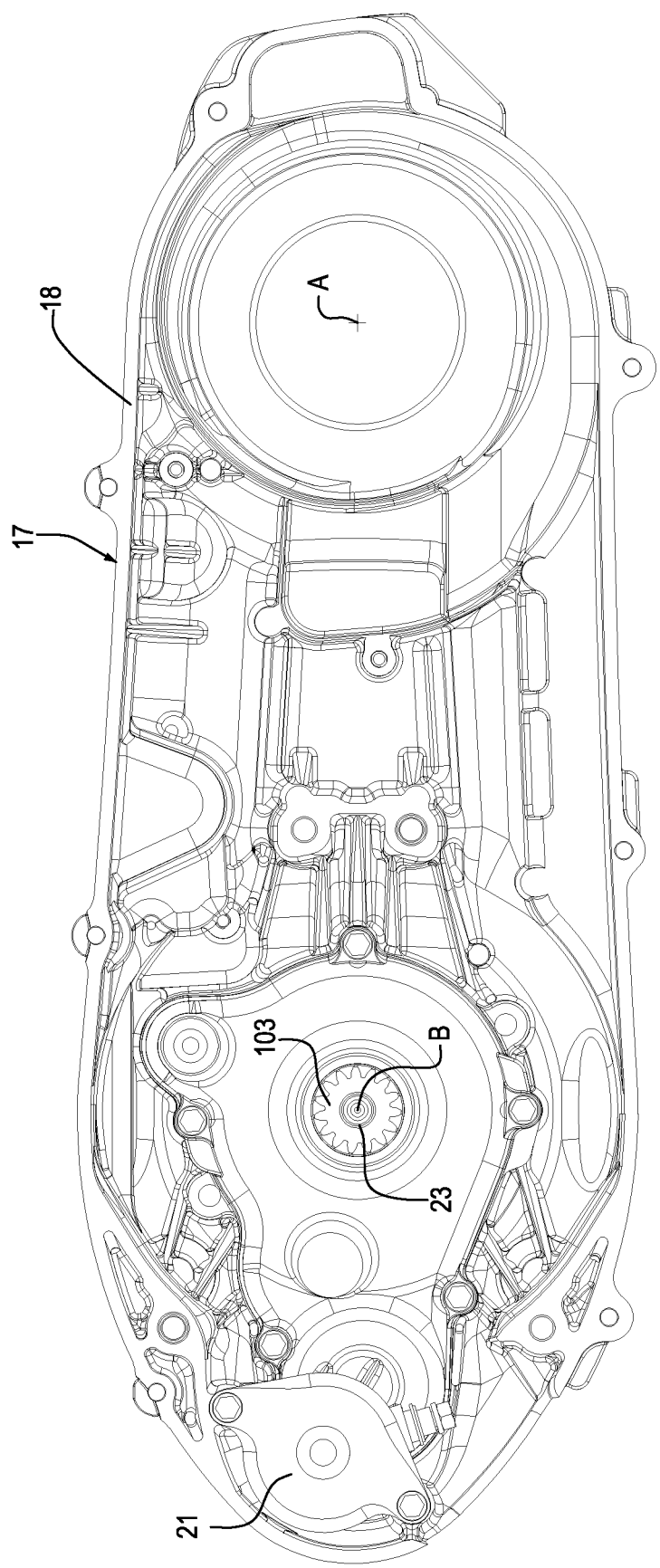
FIG. 3, an internal view of the lid of FIG. 2.

FIGS. 2 and 3 show the outer side and the inner side of a lid 18 of the case 17. The references A and B indicate the axes respectively of a driving pulley (not shown), splined on a power take-off of the endothermic engine 13, and of a driven pulley 19 (FIG. 5) of a continuously variable transmission. The features of the continuously variable transmission can be of a type known in itself and they are not described in detail herein.

Figure 4:
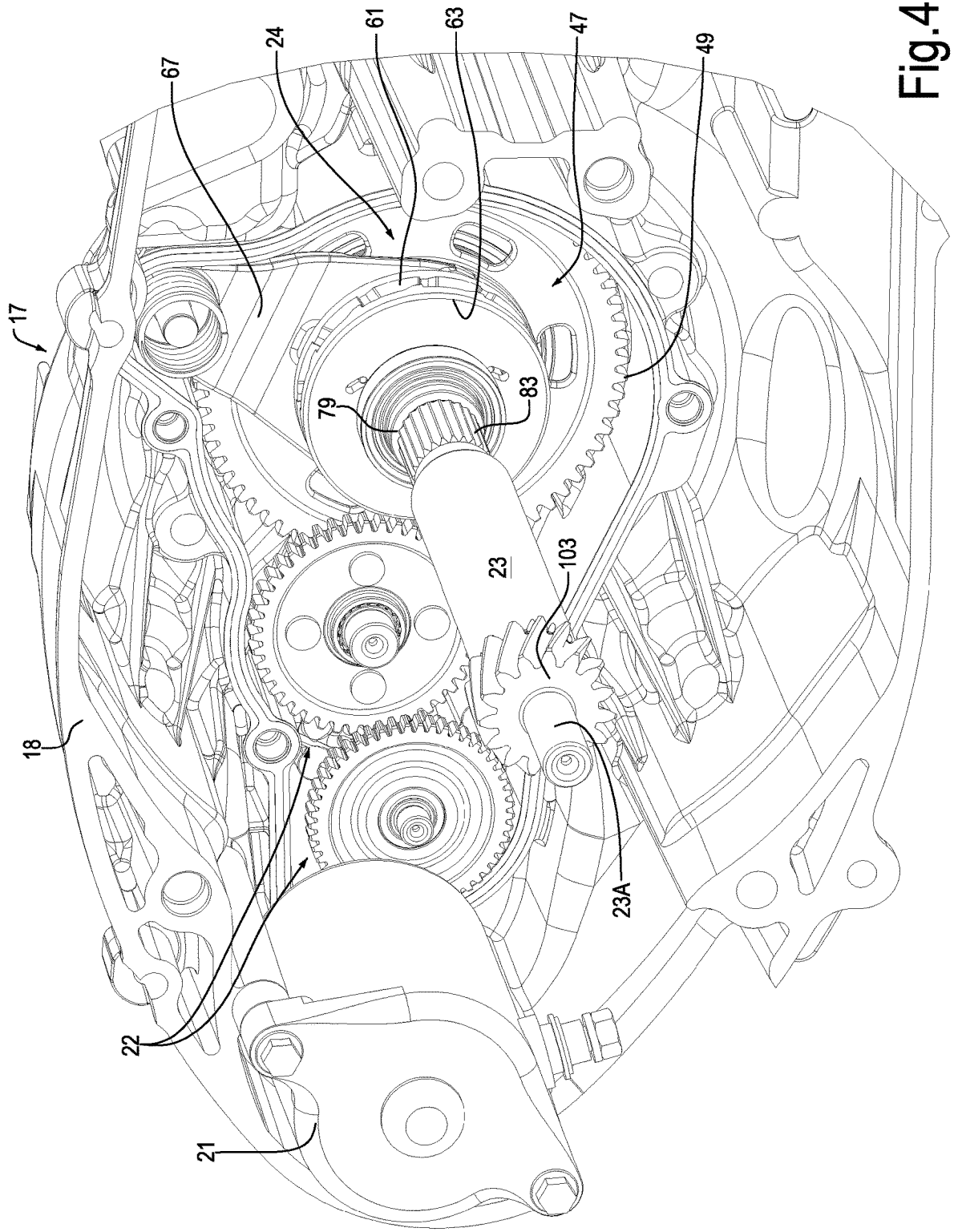
FIG. 4, an isometric view of the transmission of the motion from the reverse drive electric motor to the shaft of the driving wheel.

Inside the case 17 a reverse drive electric motor 21 is housed, which, transmits motion to a reverse drive control bushing, described in detail below, through a gear transmission indicated as a whole with the numeral 22 (FIG. 4). The reverse drive control bushing is a part of a mechanism or device for engaging the reverse drive, indicated as a whole with the numeral 24 in FIG. 4 and described in detail below.

Figure 5:
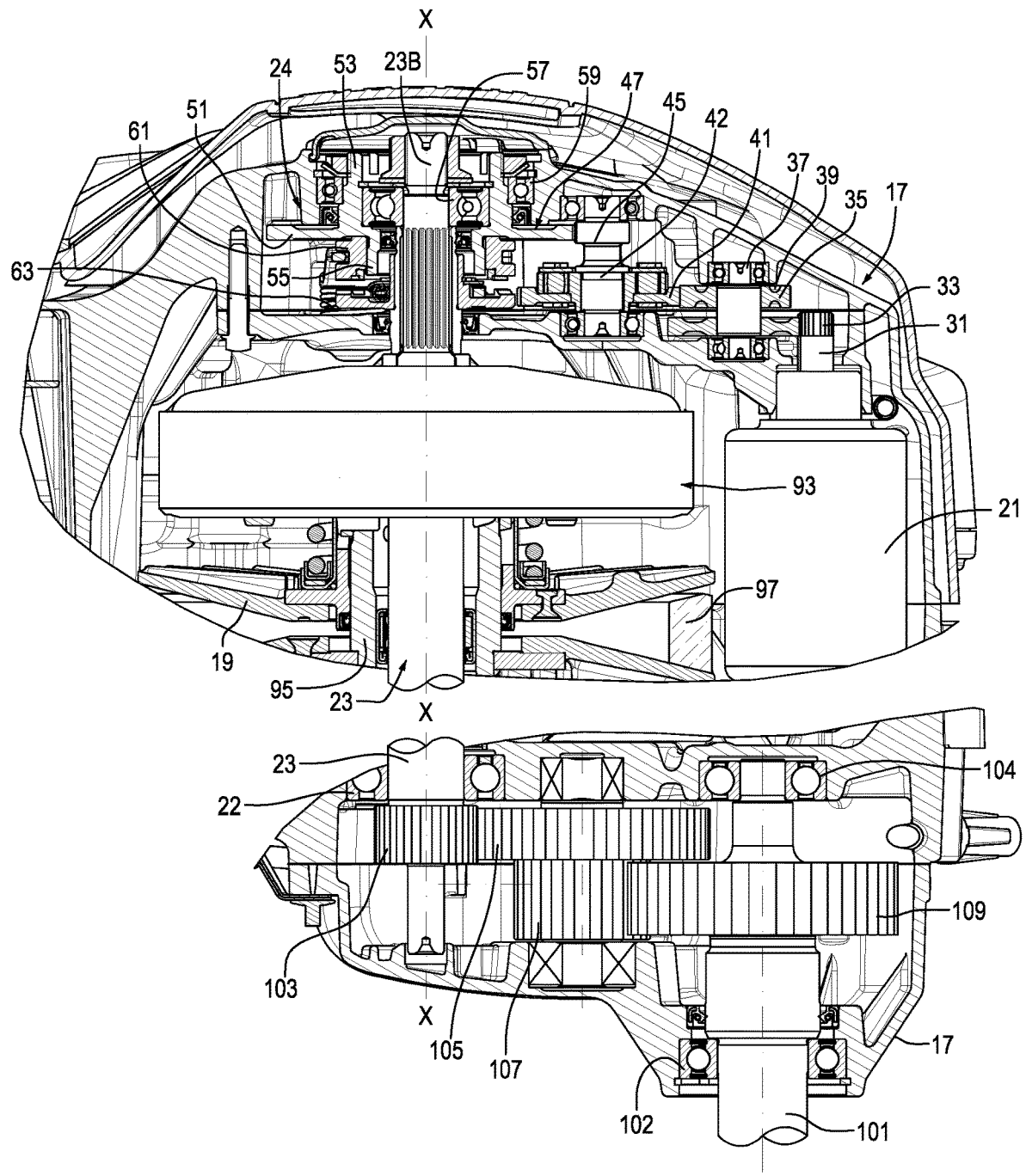

The mechanism for engaging the reverse drive connects the gear transmission 22 to a shaft 23 (FIGS. 4, 5) of the driving wheel 11. An end 23A of the shaft 23 is supported in the case 17 by means of an end bearing 22 (FIG. 5).

As shown in particular in FIG. 3, the reverse drive electric motor 21 is mounted, with respect to the shaft 23, on a side opposite to the main drive (not shown in detail) which extends from the axis A to the axis B.

Figure 13:
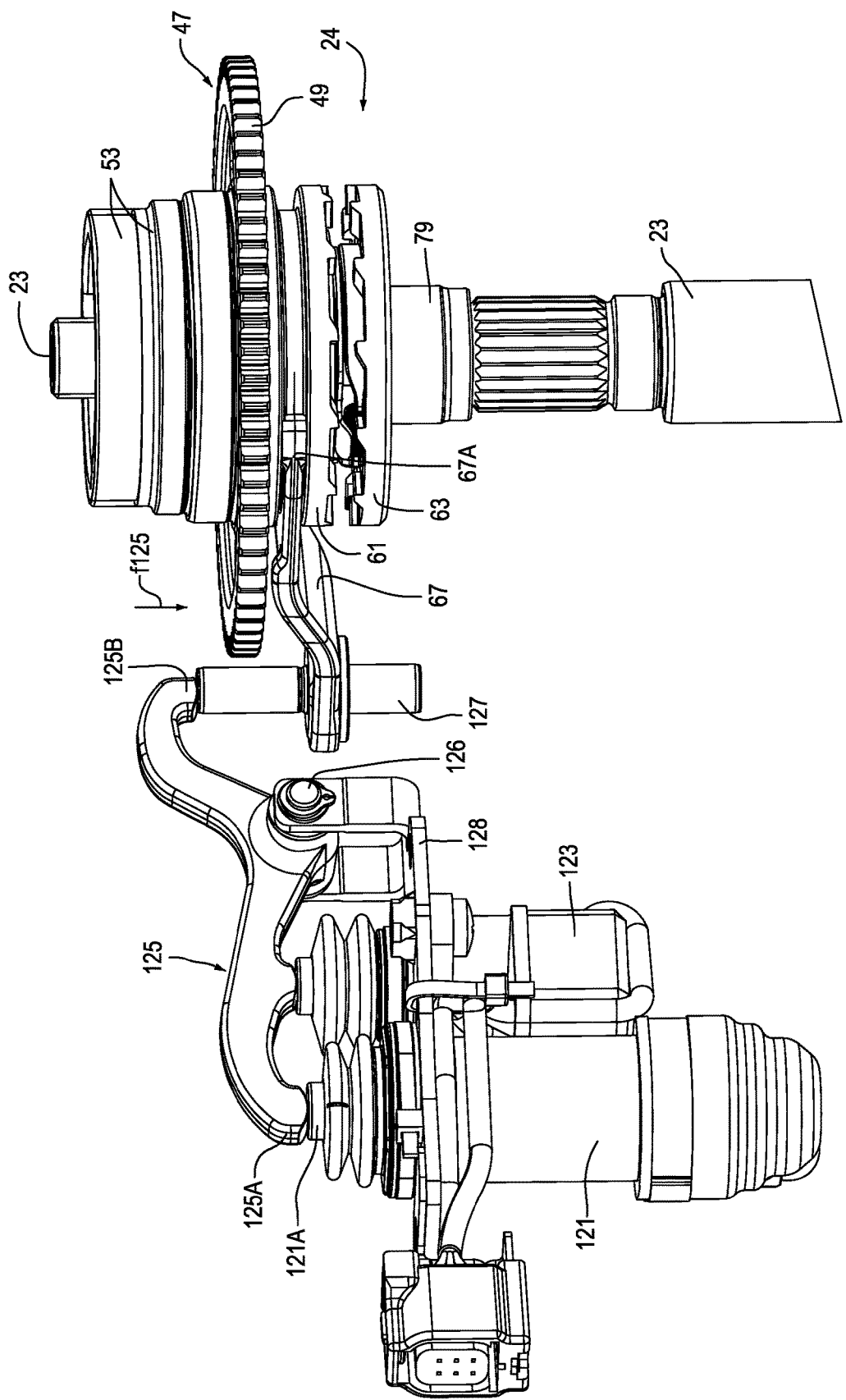
FIG. 13, an isometric view of the actuator for actuating the transmission of the reverse drive.

On the outer side of the lid 18 of the case 17 an actuation unit 25 is applied, which is described in detail below with particular reference to FIG. 13, and which controls the engagement and disengagement of the reverse drive.

Figure 6:
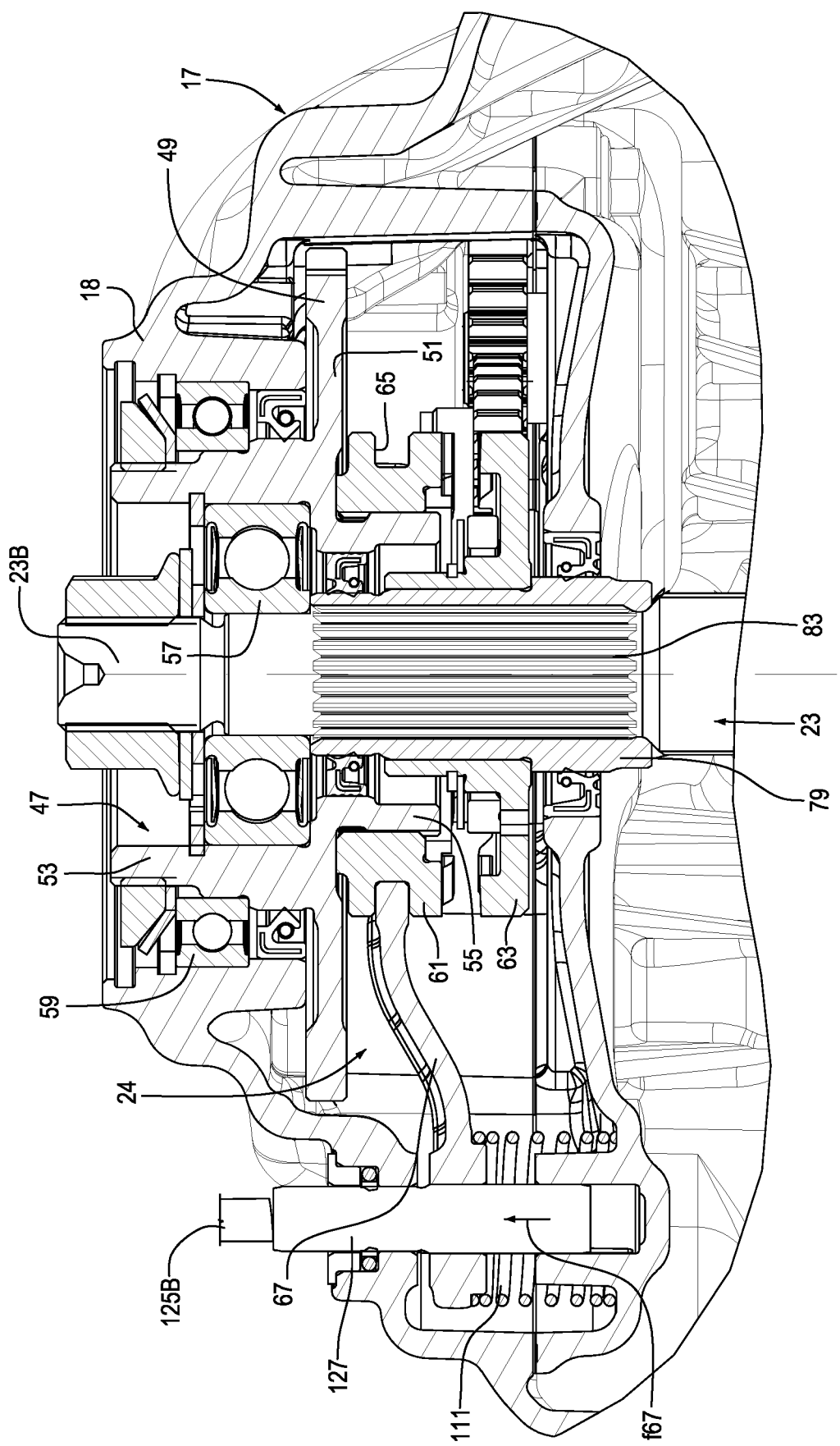
FIG. 6, a section according to a plane containing the rotation axis of the shaft of the driving wheel and of the mechanism for engaging and disengaging the reverse drive.

The gear transmission 22 that transmits motion from the reverse drive electric motor 21 to the engagement mechanism 24 is visible as a whole in FIG. 4. The individual gears that form the gear transmission are better visible in FIG. 5. More in particular, an output shaft 31 of the reverse drive electric motor 21 comprises a pinion 3 that meshes with a first gear or gear wheel 35 splined on a first shaft 37, mounted to rotate idly in the case 17. A second gear 39 is splined on the shaft 37 and in turn meshes with a gear 41 splined on a second shaft 42 mounted to rotate idly in the case 17, on which a fourth gear 45 is splined. The latter transmits the rotation motion to the control bushing 47 of the reverse drive engagement mechanism 24. The control bushing 37 is also shown in the section of FIG. 6 and it is illustrated isolated in an isometric view in FIG. 7.

More in detail, the control bushing 47 comprises a gear wheel 49 that meshes with the gear or gear wheel 45 and that is formed on the peripheral edge of a discoidal body 51. The discoidal body 51 is centrally holed and has a first approximately cylindrical portion 53 projecting from a side of the discoidal body 51 and a second approximately cylindrical portion 55 (see FIG. 6) projecting from the opposite side of the discoidal body 51. The portions 53 and 55 are coaxial to the discoidal body 51. In the approximately cylindrical portion 53 is mounted a bearing 57, wherewith the control bushing 47 is supported on the shaft 23 of the driving wheel 11. An additional bearing 59 is interposed between a mounting seat formed in the case 17 and the approximately cylindrical portion 53 of the control bushing 47. Inside the bearing 57 the second end 23B of the shaft 23 of the driving wheel 11 is inserted, so that said shaft 23 is rotatably supported in the case 17, not only by the bearing 22 (FIG. 5) at the end 23A, but also by the combination of the bearings 57, 59 at the end 23B.

Figure 7:
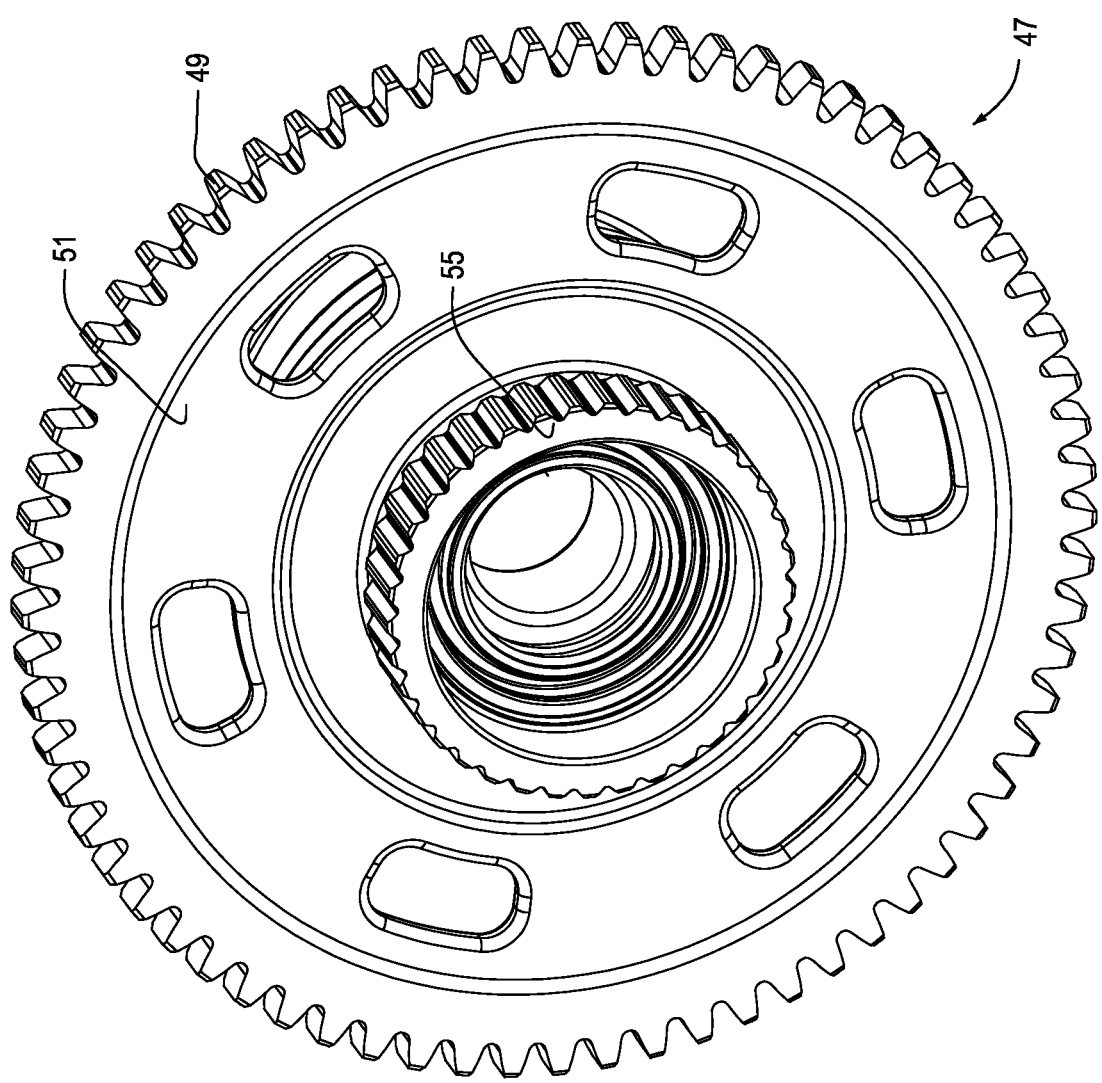
FIG. 7, an isometric view of the control bushing.

As shown in FIG. 7, the approximately cylindrical portion 55 forms a splined profile 55A for torsional coupling between the control bushing 47 and a selector 61 (FIGS. 5 and 6), which serves for the engagement and disengagement of the reverse drive, as will be clarified further on. The selector 61 is shown mounted in FIGS. 5 and 6 and isolated in an isometric view in FIG. 11. The selector 61 has a substantially annular shape and it has a splined profile 61A, which is coupled to the splined profile 55A of the control bushing 47.

Figure 8:
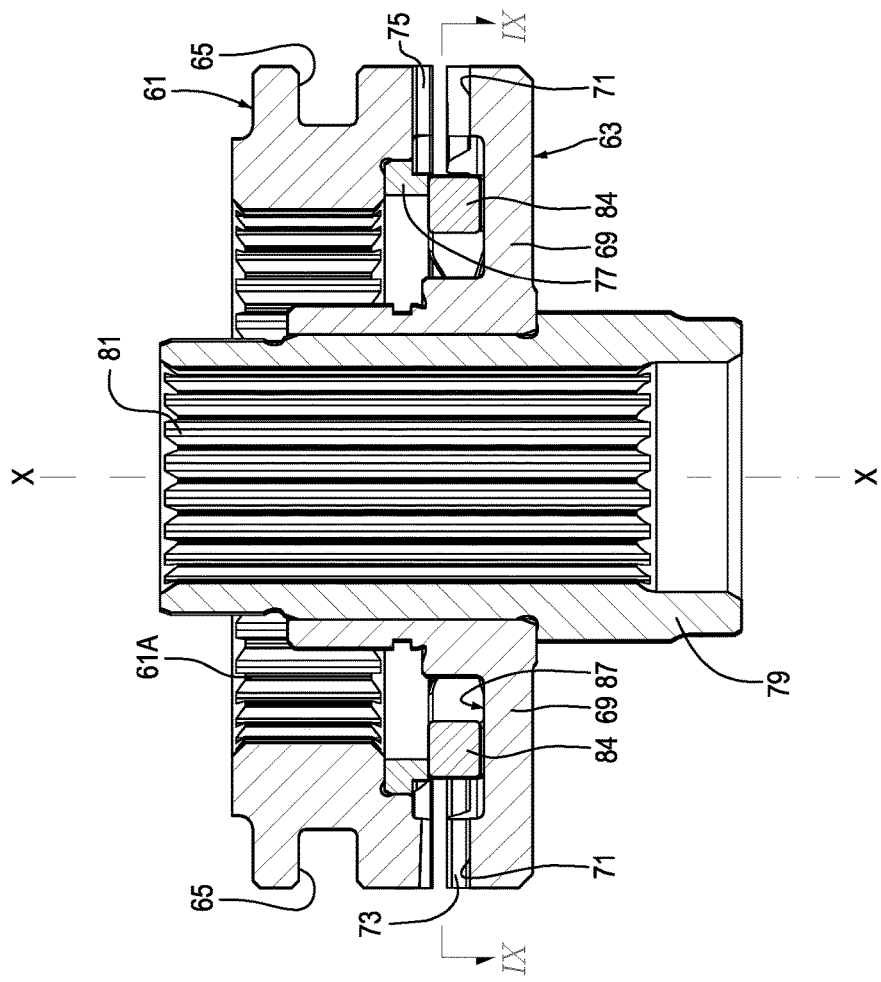
FIG. 8, a section according to a plane containing the rotation axis of the driven transmission bushing, of the selector for engaging the reverse drive and of the safety system with centrifugal masses.
Figure 11:
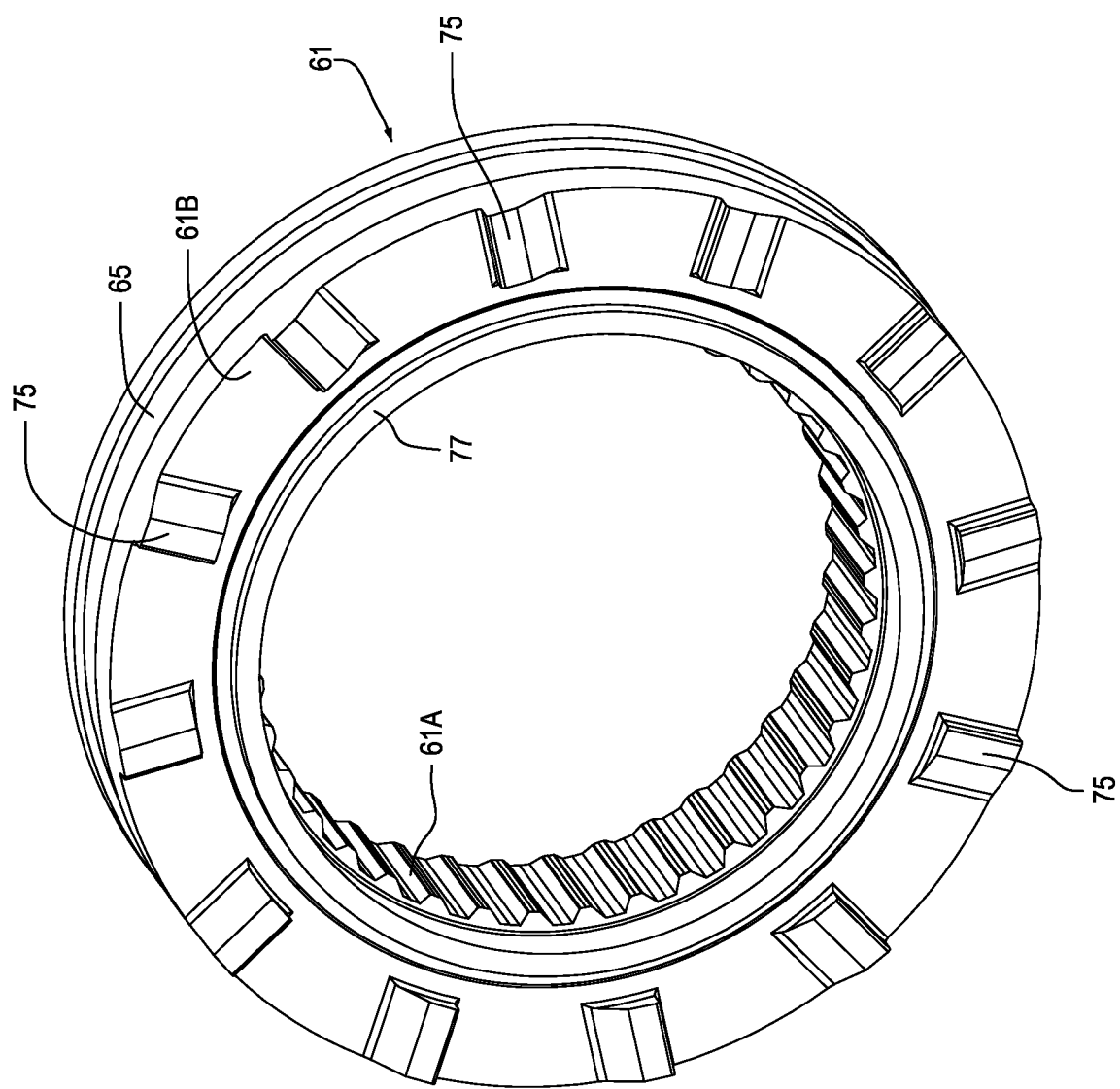
FIG. 11, an isometric view of the selector for engaging the reverse drive.
Figure 12:
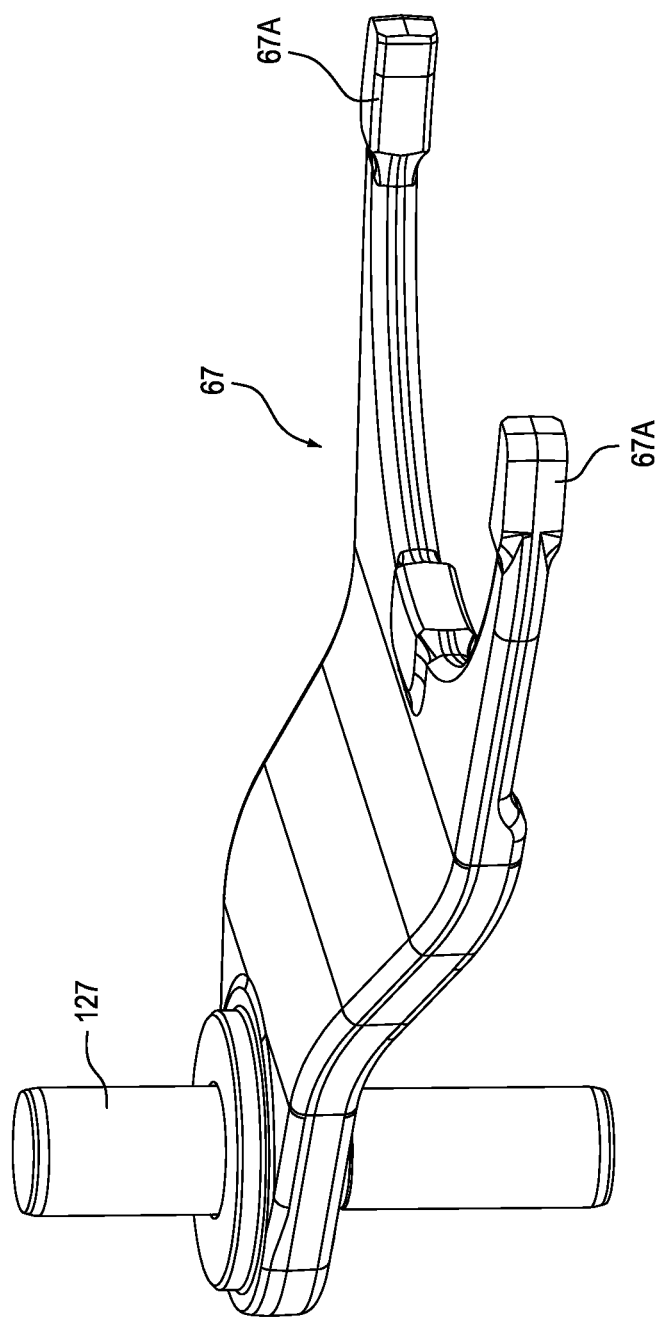
FIG. 12, an isometric view of a fork for controlling the selector.

As shown in particular in FIG. 11 and in FIG. 8, where the selector 61 is mounted on a driven transmission bushing 63 described in greater detail further on, the selector 61 has a circumferential groove 65, into which are engaged prongs 67A of a control fork 67 functionally connected to the actuation unit 25, to control the engagement and disengagement of the reverse drive, in the way described further on. The control fork 67 is shown in isolation in an isometric view in FIG. 12.

Figure 10:
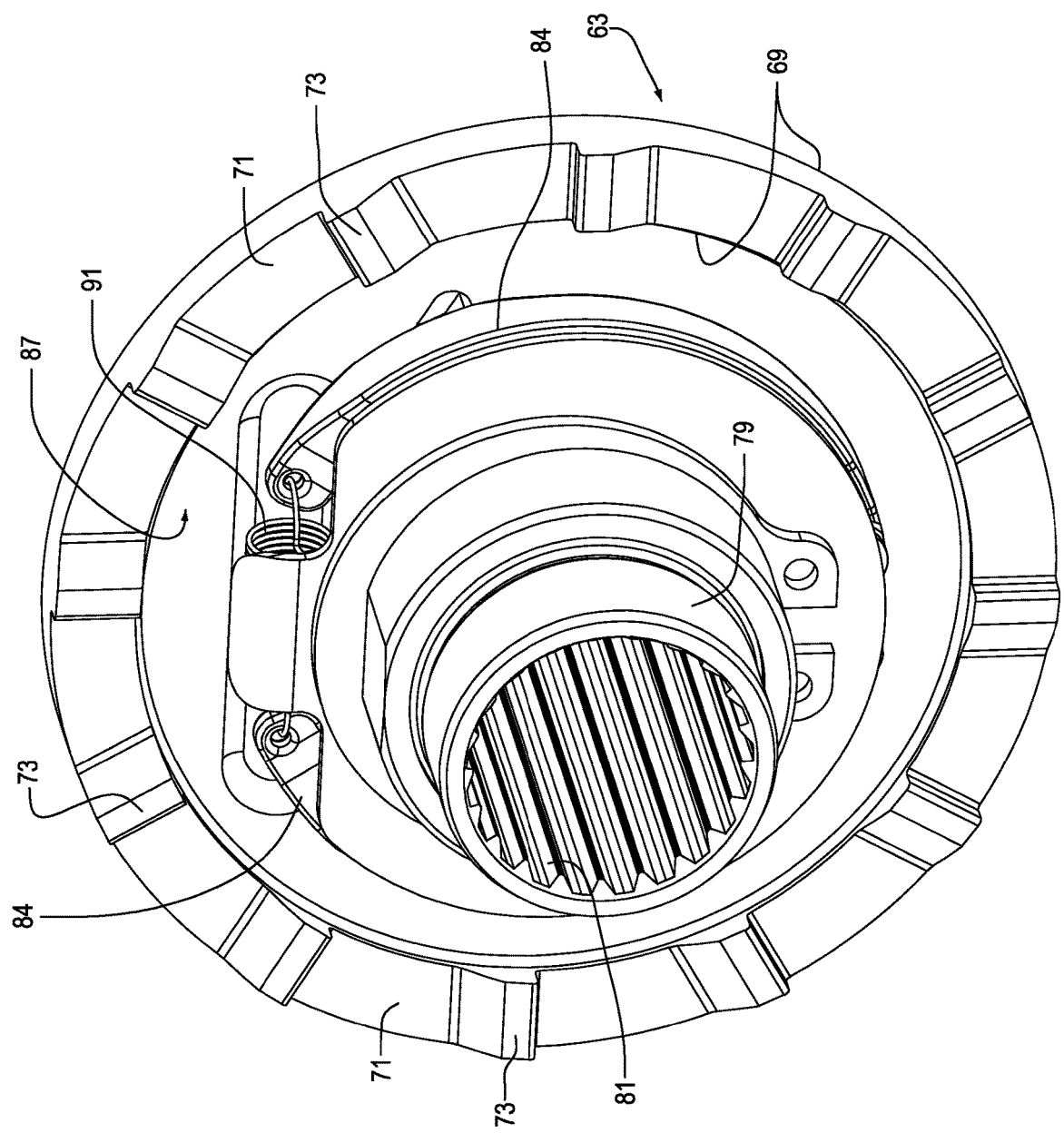
FIG. 10, an isometric view of the driven transmission bushing with related centrifugal masses of the safety system.

The driven transmission bushing 63 is shown in isolation in an isometric view in FIG. 10, together with members that form a safety system that prevents the engagement of the reverse drive if the motor vehicle 1 is moving forwards. Said safety system will be described further on. FIG. 8 shows the driven transmission bushing 63 and the selector 61 in a section according to a plane containing the rotation axis X of the driven transmission bushing 63 and of the selector 61. As shown in particular in FIGS. 8 and 10, the driven transmission bushing 63 comprises a discoidal body 69 with an annular projection 71, from which beveled front teeth 73 protrude, which define an engaging toothing. The beveled front teeth 73 are able to co-act with engaging toothing, comprising engaging beveled front teeth 75 integral with the selector 61, visible in particular in FIG. 11. The front teeth 75 protrude from a surface 61B of the selector 61 oriented towards the driven transmission bushing 63, wherefrom also an annular projection 77 protrudes, which has a diameter smaller than the diameter along which the front teeth 75 of the selector 61 are positioned. As shown in particular in the section of FIG. 8, the annular projection can be formed by a ring provided in a seat formed in the main body of the selector 61.

The driven transmission bushing 63 is splined to a bushing 79, within which a splined profile 81 is obtained, as shown in particular in FIG. 8. When mounted, the bushing 79 with the transmission bushing 63 splined thereon, is invested on the shaft 23 of the driving wheel. The splined profile 81 of the bushing 79 engages a corresponding grooved profile 83 formed on the shaft 23 of the driving wheel. In this way, the driven transmission bushing 63, the bushing 79 and the shaft 23 of the driving wheel 11 are coaxial and torsionally bound to each other to rotate integrally.

The driven transmission bushing 63 is associated with a safety system that prevents the engagement of the reverse drive when the motor vehicle 1 is advancing in a forward direction of travel and in any case when the driving wheel 11 is rotating at an angular speed higher than a certain threshold value. In the illustrated embodiment, the safety system is a centrifugal system. In short, the safety system comprises masses that rotate together with the driven transmission bushing 63 and with the shaft 23 of the driving wheel 11. If the shaft 23 rotates at a speed higher than the threshold speed, then the centrifugal force acting on the rotating masses together with the driven transmission bushing 63 and with the shaft 23 are arranged in a radial position, distant from the rotation axis (axis X), thereby preventing the engagement of the reverse drive.

Figure 9A:
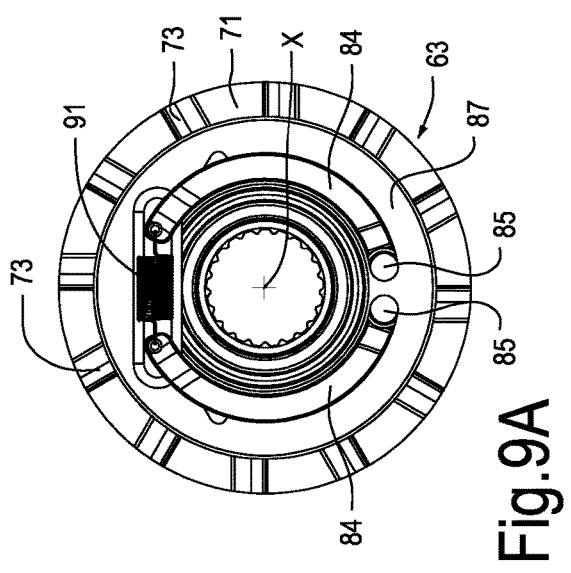
FIGS. 9A and 9B, two views according to line IX-IX of FIG. 8 of the safety system with centrifugal masses in two different positions of the centrifugal masses.
Figure 9B:
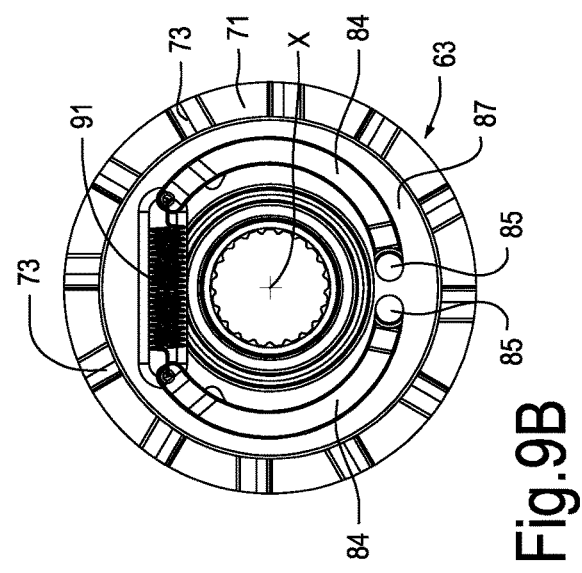

More in particular, in the embodiment illustrated herein, to the driven transmission bushing 63 are articulated two masses 84 through respective articulation pins 85 (see in particular FIGS. 8, 9A, 9B). For example, the masses 84 can have an arched shape and can be housed in an annular seat 87 of the driven transmission bushing 63, as shown in particular in FIGS. 8, 9A, 9B. The annular seat 87 has sufficient radial dimension to allow an oscillation of the masses 84 around the pins 85 from one to the other of two positions shown in FIGS. 9A and 9B. More in particular, in FIG. 9A the masses are in a position of minimum distance from the rotation axis X. An elastic member 91, for example a helical traction spring 91, can be fixed to ends of the masses 84 opposite to the ends in which the masses 84 are articulated through the pins 85 to the driven transmission bushing 63. The elastic member 91 stresses the masses 84 in the position of FIG. 9A, which is a position of minimum energy. When the masses 84 rotate around the axis X of the driven transmission bushing 63, the centrifugal force to which they are subjected tends to move the masses 84 from the position of FIG. 9A to the position of FIG. 9B, overcoming the elastic force of the elastic member 91.

On the shaft 23 of the driving wheel 11 is splined a clutch with flexible coupling 93, which receives the incoming motion from a hollow shaft 95, whereon is splined the driven pulley 19 of the continuously variable transmission, see in particular FIG. 5. The numeral 97 indicates a belt with trapezoidal section, which receives the motion from the driving pulley (not shown) of the continuous variator and transfers to the driven pulley 19. The rotation motion provided by the continuously variable transmission is transmitted through the clutch with flexible coupling 93 to the shaft 23 of the driving wheel 11 when the motor vehicle 1 has to advance in the forwards direction of travel.

In the illustrated embodiment, the shaft 23 of the driving wheel 11 is mechanically coupled to an axle 101 of the driving wheel 11 (see FIG. 5) by means of a series of gears.

The axle 101 is supported in the case 17 by means of bearings 102, 104. In the illustrated embodiment, the transmission between the shaft 23 and the axle 101 comprises a first gear 101 integral with the shaft 23 or formed in a single piece therewith. The first gear 103 meshes with a gear 105, splined to an intermediate shaft, mounted to rotate idly in the case 17 and where to an additional gear 107 is splined. The latter meshes with a gear 109 splined to the axle 101 of the driven wheel 11.

The operation of the transmission unit described hitherto is as follows.

During the forward travel of the motor vehicle 1, the endothermic engine 13 provides mechanical power to the rear driving wheel 11 through the transmission comprising the speed variator which comprises the driving pulley (not shown), the belt 97 and the driven pulley 19. The motion is transmitted from the driven pulley 95, through the hollow shaft 95 and the clutch with flexible coupling 93, to the shaft 23 and therefrom, through gears 103, 105, 107, 109, to the axle 101 of the driving wheel 11.

During the forward travel of the vehicle 1, the reverse drive device is inactive. The control fork 67 is in a rearward position, in which it is pushed by a compression spring 111 (FIGS. 5 and 6), which biases the control fork 67 according to the arrow f67. In this position, the control fork 67 maintains the selector 61 in an inactive position, shown in FIGS. 5 and 6. In this inactive position, the front teeth 75 of the selector 61 are disengaged from the front teeth 73 integral with the driven transmission bushing 63. Any rotation of the reverse drive electric motor 21 would have no effect on the driving wheel 11.

When the motor vehicle 1 advances in forward travel, the rotation of the shaft 23 causes the centrifugal masses 84 to be maintained in the expanded position of FIG. 9B. In this position, the masses 84 prevent any approaching movements of the selector 61 to the driven transmission bushing 63.

Being in the expanded position of FIG. 9B, the masses 84 are in front of the annular projection 77 integral with the selector 63, as shown in detail in FIG. 8. Any axial movement of the selector 61 towards the driven transmission bushing 63 is prevented in that the masses 84 come to abut with the annular projection 77. In this way, if an operational error or a failure of the control unit of the motor vehicle 1 were to cause the selector 61 to be pushed through the control fork 67, such a push would not cause the mutual engagement of the front teeth 73, 75.

Reverse drive can thus be engaged only if the motor vehicle 1 is motionless, or otherwise only if the axle 101 of the driving wheel 11 and hence the shaft 23 of the driving wheel 11 rotate at such a slow speed (minimum speed threshold) that the masses 84 are in the position of minimum energy represented in FIG. 9A.

To engage the reverse drive and cause the motor vehicle 1 to travel backwards, once the forward travel movement ceases, the control fork 67 is moved in a direction opposite to arrow f67 (FIG. 6). The movement is provided by an actuator described further on, through which the force of the compression spring 111 is overcome. The movement of the fork 67 in the direction opposite to arrow f67 causes an axial sliding of the selector 61 parallel to the rotation axis X of the shaft 23 of the driving wheel 11, coinciding with the rotation axis of the control bushing 47, of the driven transmission bushing 63 and of the selector 61. Sliding is allowed by the coupling between the splined profile 61A of the selector 61 and the splined profile 55A of the control bushing 47.

With this axial movement, the front teeth 75 of the selector 61 are engaged with the front teeth 73 of the driven transmission bushing 63.

Once the axial displacement of the selector 61 towards the driven transmission bushing 63 is carried out, the reverse drive electric motor 21 can be activated. This drives in rotation the control bushing 47 through gears 33, 35, 39, 41. The coupling between the splined profiles 55A and 61A transmits the motion to the selector 61 and the coupling between the front teeth 75 and the front teeth 73 transmits the rotation motion to the driven transmission bushing 63. The driven transmission bushing 63 transmits the rotation motion to the shaft 23 of the driving wheel 11 by means of the splined profile 81 meshing with the grooved profile 83 of the shaft 23. The shaft 23 then transmits the motion to the driving wheel 11 through the series of gears 103, 105, 107, 109 and the axle 101.

Once the desired reverse travel is completed, for example to park the vehicle, the reverse drive electric motor 21 can be stopped and the selector 61 can be made to move backwards, bringing the control fork 67 in the disengaged position by effect of the push effected by the compression spring 111, after deactivating the actuator that engaged the reverse drive.

If during the reverse drive the speed of rotation of the driven transmission bushing 63 becomes greater than the speed of rotation of the selector 61 and of the control bushing 47, the beveled shape of the front engagement teeth 75, 73 allows the driven transmission bushing 63 to overtake in rotation the selector 61, avoiding the risk of breakage of the components of the reverse drive system described above.

To control the motion of the control fork 67, the actuation unit 25 is provided, mounted preferably outside the case 17, as shown in FIG. 2. The actuation unit 25 is also visible in an isometric view and separate from the case 17 in FIG. 13.

In the illustrated embodiment, the actuation unit 25 comprises an actuator 121, preferably a linear actuator, i.e. having an element movable according to an axis of translation. For example, the actuator 121 can be a solenoid actuator with a movable anchor 121A. The actuator 121 can be mounted on a plate 128 integral with the case 17. The actuator 121 acts on a first end 125A of a lever 125 pivoting around a pin 126 integral with the plate 128 and hence to the case 17. The rotation pin 126 is in an intermediate position between the ends 125A, 125B of the lever 125. These ends define the constraints between the lever 125 and the actuator 121, as well as between the lever 125 and the fork 67. The movement according to arrow f121 (FIG. 13) of the movable anchor 121A of the solenoid actuator 121 causes an oscillation of the lever 125 around the pin 126 and a corresponding movement according to f125 of the second end 125B of the lever 125. The second end 125B of the lever 125 presses against a pin or stem 127 (see FIGS. 12 and 6) integral with the control fork 67.

In advantageous embodiments, the stem or pin 127 is substantially orthogonal to the main body of the control fork 67, which main body forms the two prongs 67A. In particularly advantageous embodiments, the axis of the pin 127 is parallel to the axis of the shaft 23.

The axis of the pin 127 defines the direction of translation of the fork, preferably parallel to the rotation axis of the shaft 23, of the control bushing 47, of the selector 61 and of the driven transmission bushing 63. The axis of the pin 127 is, moreover, preferably parallel to and distanced from (i.e. not coaxial) the axis of the movable anchor 121A of the actuator 121; i.e., it is parallel to the axis of the motion of the actuator 121. This particular parallel arrangement of the control fork 67 and of the actuator 121 allows to optimize the overall bulk of the motor set, with respect to an embodiment in which the actuator is mounted coaxial and at the head with respect to the stem 127 of the control fork 67.

Substantially, then, the solenoid actuator 121 is configured to push, through the multiplier lever 125, the control fork 67 to an active position against the force of the compression spring 111.

For greater safety of the reverse drive device, a safety sensor able to sense the position of the actuator and of the lever 67 may be provided. For example, if a lever 125 is provided, the sensor 123 can be associated to the lever 125, to detect the actual position of the lever itself and hence the actual (engaged or disengaged) position of the reverse drive device. The sensor 123 can for example be interfaced with a central electronic control unit, which provides authorization to the forward travel of the motor vehicle 1 only when the lever 125 is in a disengaged reverse drive position. The sensor 123 can also provide a signal authorizing the start of the reverse drive electric motor 21. Said authorization is provided only if the central control unit (not shown) receives from the sensor 123 a signal of completed engagement of the selector 61 through the control fork 67. Preferably, the sensor 123 is positioned on the same side of the lever 125 on which also the control fork 67 and the actuator are positioned, and the axis thereof is parallel to the one of these two latter elements. In other words, as shown for example in FIGS. 2 and 13, the actuator 121, the sensor 123 and the stem 127 with related control fork 67 are positioned on the side of the fork oriented towards the interior of the case 17. This particular arrangement of the control fork 67, of the actuator 121 and of the sensor 123 allows to compact the actuation unit of the control bushing 47 and to minimize the lateral bulk of the vehicle.

Use of a multiplication lever 125 interposed between the actuator 121 and the control fork 67 allows to reduce the force required from the actuator 121 and hence to reduce the cost and the dimension of the actuator.

The invention claimed is:

1. A transmission unit with a continuously variable transmission, for a motor vehicle, the transmission unit comprising:
   a shaft of a driving wheel operatively connected to a main drive to control forward drive;
   a reverse drive electric motor;
   a control bushing rotated by the reverse drive electric motor;
   a driven transmission bushing, operatively connected to the shaft of the driving wheel;
   an actuator for controlling mutual coupling between the control bushing and the driven transmission bushing to transmit the motion of the reverse drive electric motor to the shaft of the driving wheel; and
   a driven pulley of the continuously variable transmission, coaxial to the shaft of the driving wheel and around which a transmission belt of the continuously variable transmission is guided.

2. The transmission unit of claim 1, wherein the control bushing and the driven transmission bushing are coaxial to the shaft of the driving wheel and rotate with the shaft of the driving wheel about a rotation axis during reverse drive.

3. The transmission unit of claim 1, wherein the control bushing is operatively connected to the reverse drive electric motor by means of an auxiliary drive.

4. The transmission unit of claim 1, wherein the control bushing is torsionally coupled to a selector, which is axially movable with respect to the control bushing and functionally coupled to the actuator.

5. The transmission unit of claim 1, wherein: the control bushing and the driven transmission bushing are coaxial to the shaft of the driving wheel; the driven transmission bushing is torsionally coupled to the shaft of the driving wheel; the control bushing is mounted idly with respect to the shaft of the driving wheel; a movable selector is torsionally coupled to the control bushing and axially movable with respect to the control bushing under the control of the actuator, to take a position engaged with respect to the driven transmission bushing and a position disengaged with the driven transmission bushing; and wherein the selector and the driven transmission bushing are provided with engaging toothings.

6. The transmission unit of claim 5, further comprising at least one centrifugal mass mounted on the driven transmission bushing and coupled thereto such as to be able to move under the effect of centrifugal force from a first radial position at a smaller distance from a rotation axis of the driven transmission bushing to a second radial position at a greater distance from the rotation axis of the driven transmission bushing; wherein an elastic member is adapted to bias said at least one centrifugal mass in the first radial position; and wherein when said at least one centrifugal mass is in the second radial position, said centrifugal mass is positioned between the engaging toothings of the selector and of the driven transmission bushing preventing mutual engagement of said engaging toothing.

7. The transmission unit of claim 4, wherein the selector is coaxial to the control bushing and to the driven transmission bushing and is movable parallel to a rotation axis of the control bushing and of the driven transmission bushing, to take: a first position disengaged from to the driven transmission bushing, wherein the selector is torsionally coupled only to the control bushing; and a second position engaged with the driven transmission bushing, wherein the selector is torsionally coupled to the control bushing and to the driven transmission bushing, to transmit a torque from the control bushing to the driven transmission bushing.

8. The transmission unit of claim 4, wherein the selector comprises first engaging toothing, adapted to co-act with second engaging toothing integral with the driven transmission bushing to transmit the rotation of the control bushing to the driven transmission bushing.

9. The transmission unit of claim 8, wherein each of said first engaging toothing and second engaging toothing comprise respective beveled teeth to allow the driven transmission bushing to move the selector away from the driven transmission bushing when the shaft of the driving wheel rotates at an angular speed greater than the driven transmission bushing in a reverse drive direction of rotation.

10. The transmission unit of claim 1, comprising a safety system adapted to prevent reverse drive actuation if the shaft of the driving wheel is turning in a direction of forward movement.

11. The transmission unit of claim 10, wherein the safety system comprises at least one centrifugal mass, rotating with the shaft of the driving wheel and movable radially with respect thereto, as a result of the centrifugal force, from a retracted position to an extracted position, in said extracted position the centrifugal mass (84) preventing reverse drive actuation.

12. The transmission unit of claim 10, wherein:
the control bushing is torsionally coupled to a selector, which is axially movable with respect to the control bushing and functionally coupled to the actuator; and
the safety system is configured to prevent mutual engaging between the selector and the driven transmission bushing if the shaft of the driving wheel is rotating in a direction of forward movement at a speed greater than a minimum safety value.

13. The transmission unit of claim 12, wherein the safety system comprises at least one centrifugal mass mounted on the driven transmission bushing and connected thereto so as to be able to move under the effect of the centrifugal force from a first radial position, at a smaller distance from the rotation axis of the driven transmission bushing, to a second radial position, at a greater distance from the rotation axis of the driven transmission bushing; wherein an elastic member is configured to return the centrifugal mass to the first radial position; and wherein when the centrifugal mass is in the second radial position, it prevents engagement of the selector with the driven transmission bushing.

14. The transmission unit of claim 4, further comprising a moving fork, operatively connected to the actuator and to the selector, so as to allow activation and deactivation of the reverse drive.

15. The transmission unit of claim 14, wherein the actuator is a linear actuator provided with an element movable according to an axis of the actuator, and wherein the axis of translation of the fork is parallel to the axis of the actuator.

16. The transmission unit of claim 14, wherein the selector is torsionally free with respect to the fork, so as to be able to rotate about the rotation axis of the selector with respect to the fork, and is axially constrained to the fork, so that an axial movement of the fork causes a movement of the selector along the rotation axis of the selector;
and wherein the actuator is adapted to impart an axial movement to the fork.

17. The transmission unit of claim 14, further comprising a control lever adapted to rotate about an articulation pin and functionally connected to the actuator and to the fork to transmit the movement of the actuator to the fork, said articulation pin being arranged in an intermediate position between a first constraint of the lever to the actuator and a second constraint of the lever to the fork.

18. The transmission unit of claim 17, wherein the fork and the actuator are arranged so as to co-act with the control lever on the same side of said control lever.

19. The transmission unit of claim 1, comprising a safety sensor adapted to detect a position of the actuator.

20. The transmission unit of claim 1, wherein the reverse drive electric motor is arranged, with respect to the shaft of the driving wheel, on the side opposite to the main drive.

21. The transmission unit of claim 3, wherein the reverse drive electric motor and the auxiliary drive are mounted in a case of the transmission unit, the case housing the main drive.

22. The transmission unit of claim 1, further comprising a transmission between the shaft of the driving wheel and a driving wheel axle.

23. The transmission unit of claim 1, comprising a flexible coupling, which receives the incoming motion from a hollow shaft, whereon is splined a driven pulley of the continuously variable transmission; and wherein the output of the flexible coupling is mechanically coupled to the shaft of the driving wheel.

24. A motor vehicle comprising:
a driving wheel; and
a transmission unit comprising:
a shaft of the driving wheel operatively connected to a main drive to control forward drive;
a reverse drive electric motor;
a control bushing rotated by the reverse drive electric motor;
a driven transmission bushing, operatively connected to the shaft of the driving wheel;
an actuator for controlling mutual coupling between the control bushing and the driven transmission bushing to transmit the motion of the reverse drive electric motor to the shaft of the driving wheel;
a driven pulley of the continuously variable transmission, coaxial to the shaft of the driving wheel and around which a transmission belt of the continuously variable transmission is guided; and
an internal combustion engine operatively connected to the driving wheel by means of the main drive of the transmission unit.

25. The transmission of claim 8, wherein each of said first engaging toothing and second engaging toothing comprises respective front engaging teeth.

26. A transmission unit with a continuously variable transmission, for a motor vehicle, the transmission unit comprising:
a shaft of a driving wheel operatively connected to a main drive to control forward drive;
a reverse drive electric motor;
a control bushing rotated by the reverse drive electric motor;
a driven transmission bushing, operatively connected to the shaft of the driving wheel; and
an actuator for controlling mutual coupling between the control bushing and the driven transmission bushing to transmit the motion of the reverse drive electric motor to the shaft of the driving wheel, wherein the control bushing is torsionally coupled to a selector, which is axially movable with respect to the control bushing and functionally coupled to the actuator, wherein the selector comprises first engaging toothing, adapted to co-act with second engaging toothing integral with the driven transmission bushing to transmit the rotation of the control bushing to the driven transmission bushing, wherein each of the first engaging toothing and the second engaging toothing comprise respective beveled teeth to allow the driven transmission bushing to move the selector away from the driven transmission bushing when the shaft of the driving wheel rotates at an angular speed greater than the driven transmission bushing in a reverse drive direction of rotation.

27. A transmission unit with a continuously variable transmission, for a motor vehicle, the transmission unit comprising:
- a shaft of a driving wheel operatively connected to a main drive to control forward drive;
- a reverse drive electric motor;
- a control bushing rotated by the reverse drive electric motor;
- a driven transmission bushing, operatively connected to the shaft of the driving wheel;
- an actuator for controlling mutual coupling between the control bushing and the driven transmission bushing to transmit the motion of the reverse drive electric motor to the shaft of the driving wheel; and
- a safety system adapted to prevent reverse drive actuation if the shaft of the driving wheel is turning in a direction of forward movement.

* * * * *